April 20, 1954
H. J. STEGEMAN
2,676,032
SULKY HITCH
Filed Feb. 23, 1950
2 Sheets-Sheet 2
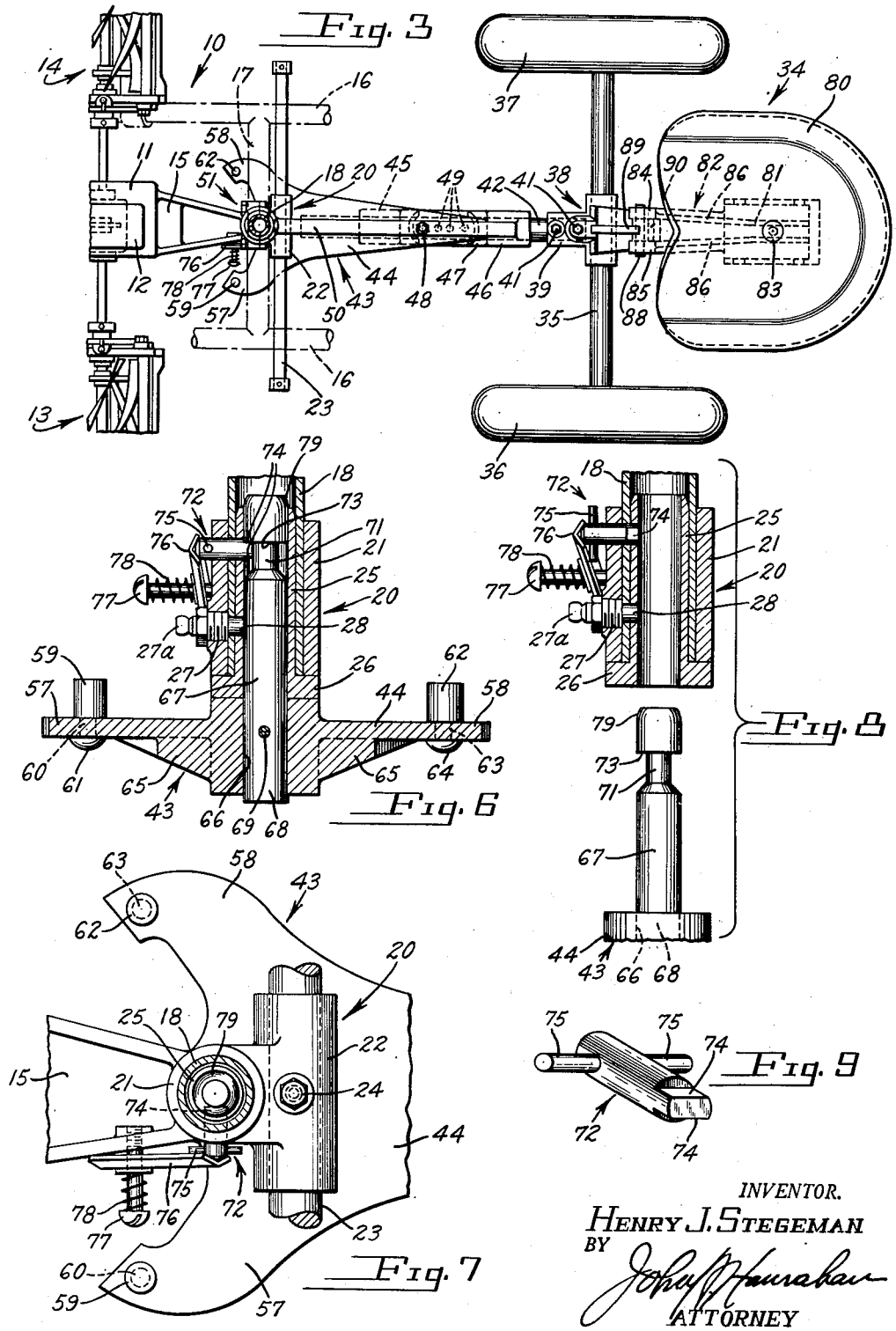
INVENTOR.
Henry J. Stegeman
BY
*[signature]*
ATTORNEY Patented Apr. 20, 1954

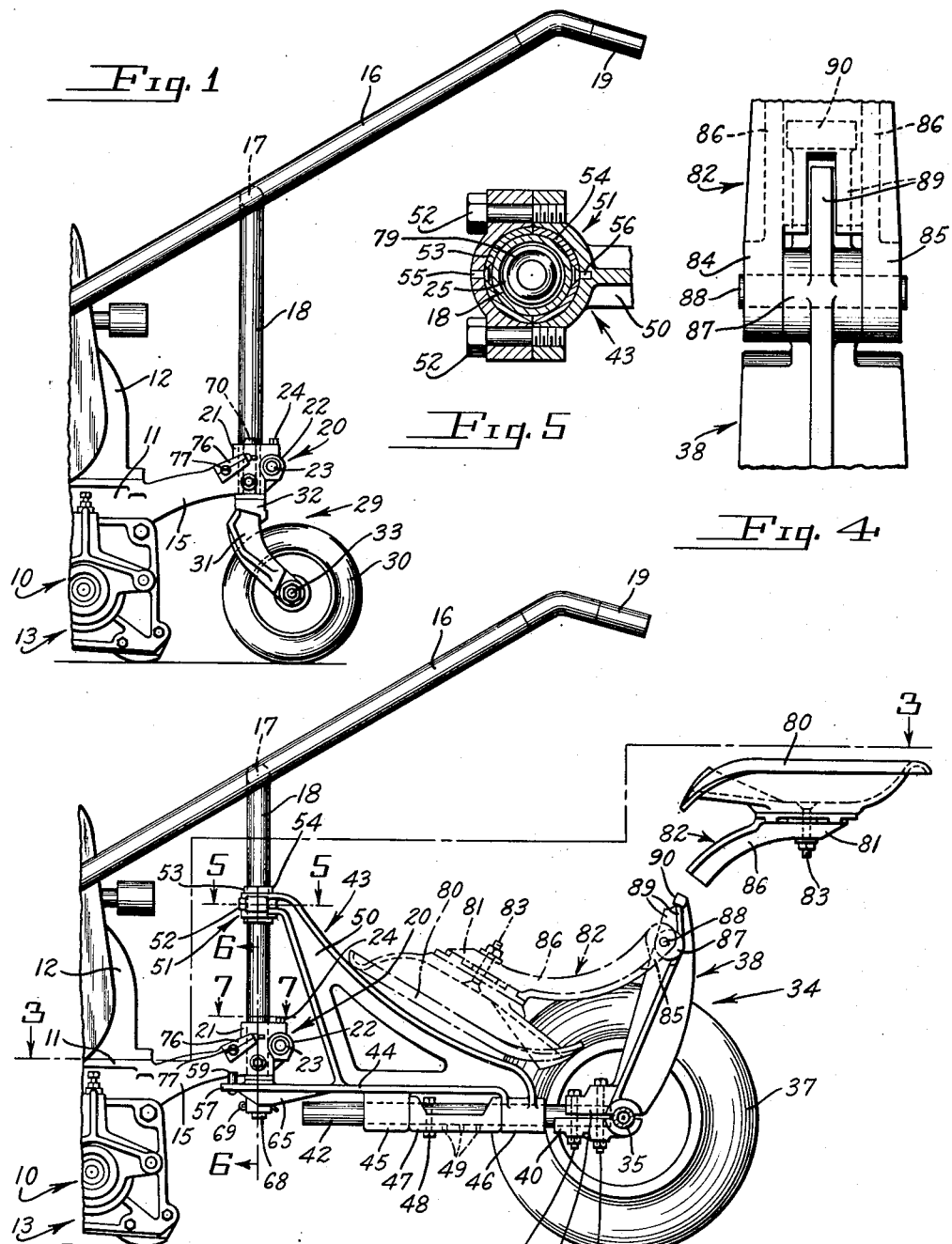

2,676,032

UNITED STATES PATENT OFFICE 2,676,032

SULKY HITCH

Henry J. Stegeman, Fairfield, Conn., assignor to The Locke Steel Chain Company, Bridgeport, Conn., a corporation of Connecticut Application February 23, 1950, Serial No. 145,840

8 Claims. (Cl. 280—415)

This invention relates to new and useful improvements in a riding sulky for a power lawn mower or tractor or the like, and which sulky can be quickly and easily detached and replaced by a castor or other implement to support the rear end of the machine and vice versa.

I have provided an improved sulky structure for the purpose described and which includes improved means for attaching it to and detaching it from a power lawn mower or other form of tractor, an improved seat mounting structure, and certain other improvements providing for movements of the sulky relative to the power lawn mower or other tractor structure about both vertical and horizontal pivots.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view showing a portion of a power driven lawn mower having a castor wheel mounted by parts providing for easy and quick dismounting of the castor wheel and for the mounting of a sulky on the motor;

Fig. 2 is a side elevational view showing only the rearward portion of such lawn mower but showing my improved sulky attached thereto and replacing the castor wheel of Fig. 1, the near wheel of the sulky being omitted;

Fig. 3 is a top plan view taken as along the line 3—3 of Fig 2;

Fig. 4 is a detail front elevational view on a larger scale, of the hinge mounting of the sulky seat;

Fig. 5 is a detail horizontal sectional view taken as along the line 5—5 of Fig. 2;

Fig. 6 is an enlarged detail vertical sectional view taken as along the line 6—6 of Fig. 2;

Fig. 7 is an enlarged sectional view, the view being taken as along the plane of the line 7—7 of Fig. 2;

Fig. 8 is a sectional view as on the same plane as Fig. 6 showing the parts detached; and Fig. 9 is an isometric of an attaching pin employed.

The present invention comprises improved sulky and means for attaching a sulky to a power lawn mower such as, for example, that disclosed in Patent 1,944,584 of January 23, 1934. For the purpose of illustrating the invention, certain parts of the lawn mower disclosed in that patent have been employed although a detailed description of such parts is believed unnecessary here.

Referring in detail to the present drawings, a power lawn mower is generally designated 10 and the same includes a frame 11 upon which is carried a motor 12 which through means (not shown) drives ground engaging rolls (not shown) as well as other parts of the machine. The mower illustrated is of the type employing three cutting reels comprising a main forward reel (not shown) and side reels or cutter mechanism generally designated 13 and 14, respectively. The mower frame 11 includes a rearward extension 15 to be hereinafter further referred to. Additionally, the mower includes spaced rearwardly extending handles 16 between which extends a cross brace 17 rigidly supporting a depending tubular member 18. The handles 16 incline upwardly and rearwardly and at their rear ends are off-set downwardly providing hand grips 19. These parts form a very rigid structure preventing any twisting yield of the tubular member 18 when the sulky tongue 42 (to be described) is at an angle and when the driving torque of the motor has a tendency to raise or lower the frame extension 15, depending on the direction in which the power is applied. Since the details of construction of the actual mower elements of the mower 10 form no part of the present invention, further description of the details is believed unnecessary here.

The extension 15 of the mower frame 11 terminates in a structure generally designated 20 and comprising right-angularly related tubular portions 21 and 22. Of these, portion 21 is a vertically arranged bearing member and receives and restrains the lower end portion of the tubular member 18, while portion 22 is located horizontally. A foot bar 23, also substantially horizontally arranged, extends through the tubular portion 22 projecting from both ends of the latter and has its mid-portion in such housing. Preferably, bar 23 is secured against casual longitudinal movement by a screw or the like 24.

As will be seen, particularly by reference to Figs. 6 and 8, a sleeve-like bearing or bushing 25 is received in the lower end of the tubular member 18. The lower end of member 18 terminates substantially flush with the lower end of the tubular portion 21 of the member 20 and the bushing or bearing 25 includes an enlarged diameter head-like portion 26 extending below and abutted by the lower ends of the housing portion 21 and the tubular member 18.

A screw 27 is threaded into housing portion 21 in radial relation thereto and has its inner unthreaded end portion 28 passing through registering openings in the lower portion of the tubular member 18 and the sleeve or bushing 25 whereby the latter is secured in place against casual movement and the lower end of the member 18 is tied to the member 20 which is shown as rigid with the mower frame extension 15. The screw 27 is conveniently provided with a grease fitting 27a.

When the mower is being used without a sulky, a castor generally designated 29 is employed. Such castor includes a wheel 30 mounted between the arms of a fork structure 31 at the upper end of which is a head-like portion 32 rigidly mounting a pivot post 70 of the construction of a pivot post 67 of the sulky and later to be described. The mentioned pivot post 70 is rigid with the fork frame 31 and it will be understood that the wheel 30 is rotatable on the axis 33 at the lower end of the fork. When the castor 29 is being used, the mentioned pivot post 70 is entered into the bushing 25 and is releasably held therein as will hereinafter fully appear.

My improved sulky is generally designated 34. This sulky includes a tubular shaft or axle 35 at its respective ends mounting ground engaging wheels 36 and 37. Clamped on the axle 35 is a bracket member including an upwardly directed portion 38 and an integral horizontal forwardly directed portion 39 as well as a separate horizontal portion 40 for cooperation with said portion 39. This bracket structure is clamped on the shaft 35 upon the tightening of nuts applied to bolts 41 passing through portions 39 and 40. These bolts also fasten to the axle housing a forwardly extending connecting member comprising a sulky tongue 42.

An angle bracket, generally designated 43, provides for relative movement between the sulky and mower about both vertical and horizontal axes, as will fully appear. This bracket includes a horizontal plate-like portion 44 from which depends a pair of widely spaced bearings or tubular extensions 45 and 46 slidably and rotatably receiving the sulky tongue 42. Turning or rotational movement between the tongue 42 and the bearing extensions 45 and 46 is about a horizontal axis and permits the sulky axle 35 to flex, independent of the mower axle, to compensate for uneven contour of the lawn or ground surface.

Between bearings 45 and 46, a spacer bushing 47 is located and is fastened in the desired relation, lengthwise of the tongue 42, by a bolt 48. The spacer bushing 47 takes the end thrust, forward and backward, and is shown as having a plurality of holes or perforations 49. Through the selected one of these holes, the bolt 48 is passed to assemble the sulky in the desired relation to the mower whereby the distance between the sulky seat and the foot bar 23 is adjusted to suit various leg lengths of the operators. In this connection, it will be understood that the bolt 48 has a fixed position lengthwise of the sulky tongue 42.

Bracket 43 also includes a forwardly extending upwardly directed arm 50 at its upper end mounting a split bearing 51 (see Fig. 5) the portions of which are clamped together on tightening of the bolts 52. Split bushing halves 53 and 54 are fastened by headed elements 55 and 56 to the respective members of the split bearing 51. The tubular member 18 extends through this split bearing when the sulky 34 is hitched to the mower 10, and this split bearing is a convenience in attaching and detaching the sulky.

The horizontal plate-like portion 44 of the bracket 43 is laterally enlarged (see particularly Fig. 7) in its forward portion and is divided or bifurcated being provided with a pair of arms 57 and 58. A stud 59 extends upwardly from the upper side of the arm 57 and this stud is shown as including reduced diameter pin-like portion 60 passing through said arm and at the underside thereof such portion is upset or headed as at 61, whereby the stud is rigidly secured to the arm. Similarly, a stud 62 projects upwardly from the upper side of the arm 58 and has a reduced diameter lower end portion 63 passing through such arm and at the underside thereof upset or headed as at 64.

At its forward end and intermediate the arms 57 and 58, the portion 44 of bracket 43 is substantially thickened and strengthened as at 65 (see Fig. 6) and has a vertical opening 66 therethrough. A sulky pivot post 67 has its lower end portion 68 disposed in the opening 66 and then as by a cotter pin 69 or in any other suitable manner, this post is anchored to the bracket. Toward its upper end, but inwardly of such end, post 67 is provided with an annular groove 71. This post 67, as to length, diameter, location of groove 71, etc., is identical with the post 70 mentioned above as extending upwardly from the castor fork 31.

Post 67 together with bearing 51 provides on the bracket 43 two widely spaced bearings in vertical alignment and which together provide a vertical pivot point or axis between the mower and sulky and along which the sulky angle bracket 43 is attached to the mower. The space between the lower bearing, i. e., post 70 and bushing 25 and the upper bearing 51 is sufficient to relieve the heavy torque strain when the driving power is applied either forward or reverse. When the sulky is turned at an angle this torque puts a twisting strain on the mower frame. This vertical pivot acts as a fifth wheel or steering knuckle on any wheeled vehicle and holds the mower and sulky rigid longitudinally and yet permits of lateral flexing for steering. When steering to the extreme right or left the studs 59 and 62 will strike the frame extension 15 and prevent the mower and sulky from jackknifing when the mower is travelling in reverse.

When the sulky is attached to the mower 10, the post 67 is within the sleeve or bushing 25 and the parts are related as in Fig. 6. At this time, a spring pressed locking bolt 72 (shown alone in Fig. 9) has its inner end portion entering the groove 71 of post 67. Groove 71 is defined in part by a straight upper shoulder 73 and the inner end portion of bolt 72 is milled or otherwise cut away on a pair of opposite sides providing it with flats 74. A small diameter finger piece or crossbar 75 passes through and is rigid with the outer end portion of the bolt 72.

Clearly, locking bolt 72 is radially movable and at its outer end is engaged by an end portion of a presser member or bar 76 which bears against said outer end of the bolt. Through the other end of this presser member 76 passes an anchoring bolt 77 and surrounding the latter is a coil spring 78 bearing at its inner end against the member and at its outer end against the underside of the head of the bolt. Thus, spring 78 acting on the presser member 76 is constantly urging the latter against the locking bolt 72 and thereby constantly urging the latter inwardly as from the position of Fig. 8 to that of Fig. 6.

At this time, when the post 67 is in the sleeve or bushing 25 and the bolt 72 is in its inner position with one of its flats 74 at the under side of the shoulder 73 of the post, the split bearing 51 is assembled about the vertical member 18. Therefore, as the mower is driven, the sulky is drawn along with it. If it is desired to substitute the castor 29 for the sulky, the bearing 51 is opened by removing bolts 52 and the bolt 72 is drawn radially outwardly to have its inner end clear the groove 71 in the post 67. Now the locking bolt 72 is turned until the finger piece 75 is in a vertical position, or a position at ninety degrees to its former position and its flattened end will rest on the full diameter portion of the pivot post 67 above the groove 71 in the latter. Locking bolt 72 is thus prevented from entering groove 71 of post 67. Then by raising upwardly or upward tilting of the rear portion of the mower, the post 67 is free to slide from the bushing or sleeve 25 as shown in Fig. 8.

With the sulky released, the spring 78 and pressure member 76 force the pin 72 into the member 21 until the finger pin 75 contacts part 21 whereupon pin 72 has reached the limit of its inward movement. The castor 29 may now be applied by raising the rear portion of the mower and inserting the post 70 of the castor into the sleeve 25. The top of the castor pivot post 70 being rounded or chamfered, on its coming into contact with the inner end portion of the bolt 72, the latter is cammed aside and forced outwardly until the post enters its bearing. Thereupon on the finger pin 75 being turned back to horizontal position the bolt 72 may again move inwardly to have its inner end partly enter the groove of said castor post and locks the castor in position.

From the above it will be understood that to remove the castor 29 from the mower 10 it is but necessary to shift the bolt 72 as from the position of Fig. 6 to that of Fig. 8 withdrawing the inner flattened end portion of the pin from under the shoulder of the groove of the post of the castor. As the bolt is withdrawn it is given the quarter turn above mentioned and then on elevating the rear portion of the mower to elevate the frame extension 15, the castor post may drop out of the bushing 25 separating the castor from the mower.

Now to again attach the sulky to the mower is a simple matter. For this purpose, the sulky is brought into place adjacent the mower and its split bearing 51 being open, that portion of the bearing integral or rigid with the arm 50 of the bracket 43 is brought against the rear side of the vertical tube 18 while the sulky pivot post 67 is inserted into the bushing or sleeve 25. As the post is inserted into the bushing 25, it will cam the bolt 72 outwardly and then on finger pin 75 being turned back to horizontal position, the spring 78 acting through the presser bar 76 moves the pin 72 inwardly to have it snap into the groove 71. Thereafter, the other half of the split bearing 51 is secured in place and the sulky is properly attached to the mower.

In connection with this matter of inserting the post 67 into the bearing or bushing sleeve 25, it is noted that the lower portion 68 of such post preferably has a loose fit in the opening 66 and is secured in place by a cotter pin 69. Therefore, the post 67 is not absolutely rigid with the casting flange or plate-like portion 44 and may tilt or wobble a bit and it is not necessary to absolutely align the rigid tubular member 18 and a straight rigid attaching post 67. This post being capable of wobbling or tilting slightly, it is easier to make the assembly.

In addition to the parts already described, sulky 34 includes a seat 80. This seat is shown as shaped up preferably of metal, although it may be of any desired material. As shown, the seat rests on the outer end portion 81 of an arm 82 and is secured against such portion by a bolt 83. This arm 82 is bifurcated at its inner or lower end portion where it includes portions 84 and 85. Extending from these portions along the rear side of the arms are strengthening ribs 86. The portions 84 and 85 straddle a perforated ear-like portion 87 in the upper end portion of the bracket arm 38 and a pin 88 passes through the aligned perforations in the ear 87 and the arm portions 84 and 85. This pin may have a tight fit in the ear 87 or in the portions 84 and 85 or vice versa. However, the pin serves to pivotally or hingedly mount the arm 82 on the bracket arm 38. Bracket arm 38 includes a portion 89 extending above the ear 87 and at its upper end having a flat 90.

When the seat 80 is in a position of use, the lower portions of the ribs 86 of arm 82 straddle the portion 89 of the bracket arm 38 and that portion of the arm 82 toward its lower end, but just above its bifurcation and between said ribs, bears against the flat 90 of the bracket arm extension 89 whereby the seat is rigidly supported. However, because of the pivotal connection above described, the seat is adapted to be swung as from a position of use as shown by the full lines in Figs. 2 and 3 forwardly to a position of non-use as to the broken line position of Fig. 2 wherein it rests against the angle bracket 43.

One purpose of this arrangement is to reduce the over-all length of the machine for shipping purposes or the like but a very important purpose of this arrangement is the convenience it gives in the use of the machine. For example, tipping the seat forwardly to its dotted line position in Fig. 2 gets the seat out of the way when the operator is walking behind the machine.

With the sulky attached and the mower in use, if the mower starts up a relatively steep incline it may be that the mower cannot draw the sulky with a rider thereon, the usual lawn mower seldom has sufficient traction for this purpose. Thus if the operator's experience indicates that the mower cannot climb the incline with the rider on the sulky, the operator merely dismounts from the sulky seat and tilts the seat forwardly whereupon he may walk immediately in back of the sulky and still hold onto the hand grips 19 of the shafts 16. Also, with the seat tilted forwardly, the operator may stand on the axle 35 in case he does not care to resume his seat at once. Reaching the top of the incline, without stopping the machine the operator can flip the seat back into place and mount the sulky and continue to drive the machine over the lawn.

The cross bar 23 provides a foot rest and is, of course, used by the operator in steering the assembled mower and tractor. Steering is effected by applying pressure to the bar 23 through one foot or the other toward one end or the other of such bar.

A very short turn of the mower relative to the sulky which may cause the sulky wheels to contact the side cutting units is prevented owing to the presence of the studs 59 and 62 on the arms 57 and 58 of the plate-like portion 44 of the sulky. In an assembled structure (see, for example, Fig. 3) the studs 59 and 62 are located at opposite sides of the mower frame extension 15. Thus, on any attempt to make too sharp a turn, the portion 15 of the mower frame will engage either the stud 59 or the stud 62, depending on the direction of the attempted sharp turn. Thus, a very sharp turn of the mower relative to the sulky cannot be made and the lateral spacing of the studs 59 and 62 limits any turn to one that may be safely made. Additionally, when steering to the extreme right or left, the studs 59 and 62 will strike the frame extension 15 and prevent the mower and sulky from jackknifing when the mower is travelling in reverse.

Having thus set forth the nature of my invention, what I claim is:

1. In a power lawn mower sulky hitch a frame having a rigid rearward extension carrying a structure at its rear end, said structure including a vertical pivot member, a vertical tubular member rigid with said frame and at its lower end entering said pivot member, a bushing in the lower end of said tubular member, an angle bracket comprising a rigid member including upper and lower portions, a pivot post on said lower portion and adapted to enter said bushing through the lower end of the latter and to have bearing therein, said upper portion comprising a split bearing to embrace an upper portion of said tubular member whereby said upper portion may be mounted on and dismounted from said tubular member by relative lateral movement when said split bearing is open, and means for releasably securing said post against downward movement out of said bushing but yet permitting of turning of said post in said bushing.

2. In a power lawn mower sulky hitch a frame having a rearward extension having a rearward end portion provided with a vertical bearing opening, means on said extension for turnably and releasably securing a post therein, a sulky post turnably receivable in said bearing opening, said post shaped and constructed for cooperation with said means whereby to releasably secure said post in said bearing opening and thus to secure said sulky post to said frame, a rigid vertical member restrained at one end by said extension and concentric with said bearing opening, and a sulky bearing releasably engageable with said vertical member in vertically spaced relation to said bearing opening.

3. In a sulky hitch, a vertical bearing member open through its lower end, a sulky including a pivot post insertable into and removable from said bearing member through the open lower end of the latter, said post having a circumferentially extending groove therein, a locking bolt extending through a wall of said bearing member, a spring means normally urging said locking bolt to an inner position in which it is entering said groove and preventing movement of the post out of the bearing member while permitting of relative turning of the post and bearing member on a vertical axis, said locking bolt adapted to be drawn outwardly out of said groove against the tendency of said spring means to permit of movement of said post out of said bearing member through the open lower end thereof, said groove located intermediate the ends of said post, said locking bolt at its inner end flatted on its sides whereby it is of two diameters at said end with said diameters normal to one another and adapted across its lesser diameter to enter said groove and to be turned through approximately ninety degrees when drawn outwardly and released to have its full diameter portion engage the post portion about said groove and thereby be restrained from inward movement by said spring means.

4. The sulky hitch as in claim 3 wherein said spring means comprises a presser member, an anchoring bolt passing transversely through an end portion of said presser member and anchoring it to said bearing member, a spring about said bolt and bearing against said presser member, and said presser member bearing at its other end against the outer end of said locking bolt.

5. The sulky hitch as in claim 3 wherein said locking bolt has a finger piece rigid with the outer end portion thereof and extending from opposite sides thereof in parallel relation with one of said diameters.

6. The sulky hitch as in claim 3 wherein the free end portion of said post is chamfered to provide a cam-like portion to cam said locking bolt outwardly and permit of full entrance of said post into said bearing member as they move together when said locking bolt is in its inner position.

7. In a sulky hitch, a forward frame member, a vertical bearing member rigid with the rearward end of said frame member, said frame member having side walls forwardly of said bearing member, a trailing device including a rigid forward portion, a post on said portion and insertable into and removable from said bearing member, means removably securing said post in said bearing member for relative turning of the post and bearing member on a vertical axis, said rigid forward portion of said device having a pair of spaced arms located laterally of the respective sides of said post and extending forwardly at the respective sides of said side walls of said frame member, and a stud on each of said arms and located to engage the respective side walls of said frame member and limit relative turning of said post and bearing member in either direction about said vertical axis.

8. In a power lawn mower sulky hitch a frame having a rigid rearward extension carrying a structure at its rear end, said structure including a vertical pivot member, a tubular member rigid with said frame and at its lower end entering said pivot member, a bushing in the lower end of said tubular member, an angle bracket comprising a rigid member including upper and lower portions, a pivot post on said lower portion and adapted to enter said bushing through the lower end of the latter and to have bearing therein, rigid means on said lower portion and located laterally of each side of said pivot post and positioned to engage the respective sides of said rearward extension and thereby limit relative turning of said post and bearing member to prevent jackknifing of said frame and rigid member, said upper portion comprising a split bearing to embrace an upper portion of said tubular member whereby said upper portion may be mounted on and dismounted from said tubular member by relative lateral movement when said split bearing is open, and means for releasably securing said post against downward movement out of said bushing but yet permitting of turning of said post in said bushing.

References Cited in the file of this patent

UNITED STATES PATENTS

| Number | Name | Date |
|---|---|---|
| 816,269 | Stengel | Mar. 27, 1906 |
| 1,543,304 | Tomlinson | June 23, 1925 |
| 1,680,236 | Zimmerman | Aug. 7, 1928 |
| 1,944,584 | Stegeman et al. | Jan. 23, 1934 |
| 2,144,806 | Meagher et al. | Jan. 24, 1939 |
| 2,146,145 | Huffman et al. | Feb. 7, 1939 |
| 2,354,576 | Clark | July 25, 1944 |
| 2,457,885 | Gatch | Jan. 4, 1949 |
| 2,540,591 | Nelson | Feb. 6, 1951 |